US008822063B2

(12) United States Patent
Oldenburg et al.

(10) Patent No.: US 8,822,063 B2
(45) Date of Patent: Sep. 2, 2014

(54) BATTERY, AND METHOD FOR THE PRODUCTION OF A BATTERY

(75) Inventors: Dirk Oldenburg, Ronnenberg (DE); Peter Streuer, Hannover (DE)

(73) Assignee: Johnson Controls Autobatterie GmbH & Co. KGAA (DE)

( * ) Notice: Subject to any disclaimer, the term of this patent is extended or adjusted under 35 U.S.C. 154(b) by 1119 days.

(21) Appl. No.: 12/514,012

(22) PCT Filed: Oct. 25, 2007

(86) PCT No.: PCT/DE2007/001942
§ 371 (c)(1),
(2), (4) Date: May 7, 2009

(87) PCT Pub. No.: WO2008/055472
PCT Pub. Date: May 15, 2008

(65) Prior Publication Data
US 2010/0003593 A1 Jan. 7, 2010

(30) Foreign Application Priority Data

Nov. 9, 2006 (DE) .......................... 10 2006 053 172

(51) Int. Cl.
*H01M 2/26* (2006.01)
*H01M 2/28* (2006.01)
(Continued)

(52) U.S. Cl.
CPC ................ *H01M 2/28* (2013.01); *Y02E 60/126* (2013.01); *H01M 2/206* (2013.01); *H01M 10/14* (2013.01)

USPC .............. 429/161; 429/160; 429/158; 429/7; 439/207; 439/217; 439/259; 439/374; 439/382; 439/449; 439/485; 439/557

(58) Field of Classification Search
USPC .............. 429/160, 161, 158, 7; 439/207, 217, 439/259, 374, 382, 449, 485, 557
See application file for complete search history.

(56) References Cited

U.S. PATENT DOCUMENTS 3,336,164 A * 8/1967 Miller ........................... 429/160
3,832,237 A * 8/1974 Kinsey ............................ 429/49
(Continued)

FOREIGN PATENT DOCUMENTS

JP 01 007469 1/1989

OTHER PUBLICATIONS

Wikipedia: Cuboid Definition Printed Nov. 9, 2011 { http://en.wikipedia.org/wiki/Cuboid}.*

(Continued)

*Primary Examiner* — Patrick Ryan
*Assistant Examiner* — Aaron Greso
(74) *Attorney, Agent, or Firm* — Boardman & Clark LLP

(57) ABSTRACT

A battery, in particular a lead-acid rechargeable battery, having at least one battery cell connecting element, which has a connector, which has at least one side surface, for connection to at least one plate on a lower face of the connector, and a welding lug, which is electrically conductively connected to the connector and has a recess which is bounded by a boundary, wherein, in a section which is adjacent to the side surface of the connector, the boundary has a profile which corresponds to a contour of the side surface of the connector.

19 Claims, 3 Drawing Sheets

(51) Int. Cl.
*H01M 2/24* (2006.01)
*H01M 6/42* (2006.01)
*H01M 14/00* (2006.01)
*H01R 4/60* (2006.01)
*H01R 27/00* (2006.01)
*H01R 13/15* (2006.01)
*H01R 13/62* (2006.01)
*H01R 13/64* (2006.01)
*H01R 4/38* (2006.01)
*H01R 13/648* (2006.01)
*H01R 13/58* (2006.01)
*H01R 13/00* (2006.01)
*H01R 13/73* (2006.01)
*H02B 1/01* (2006.01)
*H01M 2/20* (2006.01)
*H01M 10/14* (2006.01)

(56) References Cited

U.S. PATENT DOCUMENTS

| | | | | |
|---|---|---|---|---|
| 4,086,525 A * | 4/1978 | Ibsen et al. | | 320/136 |
| 4,171,564 A * | 10/1979 | Acton et al. | | 29/623.2 |
| 4,327,890 A * | 5/1982 | Cattano | | 249/110 |
| 4,724,190 A * | 2/1988 | Siga et al. | | 429/158 |
| 5,424,148 A * | 6/1995 | Mrotek et al. | | 429/158 |
| 5,900,332 A | 5/1999 | Marukawa et al. | | |
| 7,300,305 B2 | 11/2007 | Scotton et al. | | |

OTHER PUBLICATIONS

Written Opinion and Search Report for International Application No. PCT/DE2007/001942 dated Mar. 19, 2009.

* cited by examiner

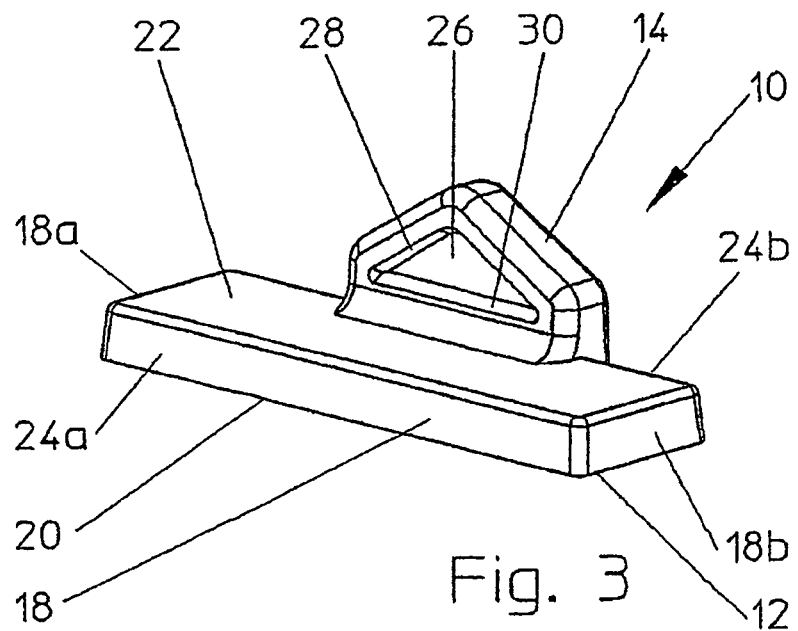
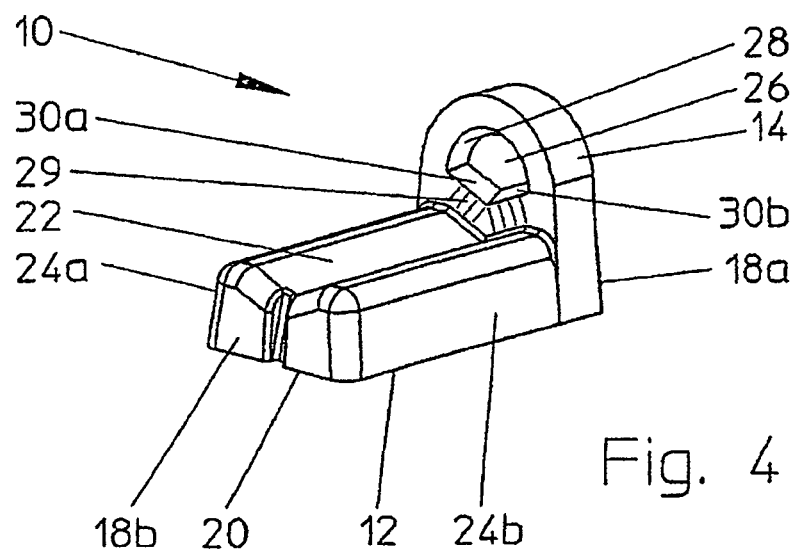

BATTERY, AND METHOD FOR THE PRODUCTION OF A BATTERY

This application is a national application of PCT/DE2007/01942 which claims priority to and the benefit of German Patent Application DE 10 2006 053 172.8, both of which are incorporated herein by reference.

BACKGROUND AND SUMMARY

The invention relates to a battery, in particular a lead-acid rechargeable battery, having at least one battery cell connecting element, which has a connector), which has at least one side surface, for connection to at least one plate on a lower face of the connector and a welding lug, which is electrically conductively connected to the connector and has a recess which is bounded by a boundary. According to a second aspect, the invention relates to a method for the production of a battery, in particular of a lead-acid rechargeable battery.

By way of example, batteries in the form of lead-acid rechargeable batteries are used as a starter battery in a motor vehicle. A battery such as this comprises a plurality of electrochemical cells which are connected in series and are separated from one another by an electrically insulating separating wall. Each of the electrochemical cells comprises a positive and a negative plate set, each of which is formed from a plurality of plates. The battery cell connecting element connects the plates of a plate set to one another electrically and mechanically and is also used for the plate set of one electrochemical cell to make electrical contact via a further battery cell connecting element with another plate set of another electrochemical cell, through the separating wall.

In order to allow such an electrical contact, during manufacture of the battery, the battery connecting elements are aligned relative to one another and relative to a recess in the separating wall. Material of the battery cell connecting element is then fused in the vicinity of the recess using hot tongs, in such way that a part of the fused material flows through the recess in the separating wall and makes an electrical contact between the two battery cell connecting elements. This results in a recess or depression, which is bounded by a boundary, being created in the battery cell connecting element.

In the case of lead-acid rechargeable batteries, the connector is generally composed of lead. The tongs have welding platelets at the points where they come into contact with the battery cell connecting elements. The welding platelets are either round or oval, like the recess, since this allows two battery cell connecting elements to be connected through the separating wall by a reliable process.

Batteries such as these generally have only voltages between 6 V and 48 V. However, high power levels of up to several kilowatts are required in modern motor vehicles, as a result of which heavy currents flow through the battery cell connecting elements when on load. Currents such as these result in undesirable heating, because of the internal resistance of the battery, and this is disadvantageous. Furthermore, the internal resistance of the battery disadvantageously limits the maximum power which can be emitted from the battery.

The invention is based on the object of overcoming disadvantages in the prior art.

The invention solves the problem by a battery of this generic type in which, on a section which is adjacent to the side surface of the connector, the boundary of the recess of the battery cell connecting element has a profile which corresponds to a contour of the side surface of the connector. In particular, the boundary has a profile which corresponds to the contour of the side surface at a point which is adjacent to the section.

According to a second aspect, the invention solves the problem by a method having the features of claim 16.

A battery cell connecting element such as this advantageously means that an electric current which flows from one plate through the connector and the welding lug through the separating wall to a further battery cell connecting element is subject to a resistance within the welding lug which is essentially independent of the current path. This results in an area-related current density which is essentially the same over that part of the boundary which corresponds to the contour of the upper face of the connector. The material which is available for electrical conduction of the current in the welding lug is therefore optimally used for the current flow, thus making it possible to achieve a reduced internal resistance. This reduces the undesirable heating of the battery during operation, and allows the battery to emit more power.

If a maximum acceptable internal resistance is specified, then the invention alternatively makes it possible to save material of which the welding lug is composed, for example lead.

A further advantage is that the invention allows the battery cell connecting elements to be connected by a reliable process.

For the purposes of the present description, the expression a side surface means in particular any surface which bounds the connector. Furthermore, the expression a contour means in particular the macroscopic geometric form of the surface of the side surface. There is no need for the contour to have a structure. A macroscopically flat upper face also has a contour, specifically a flat surface or plane. Furthermore, there is no need for the boundary to correspond to the contour of the side surface everywhere where it runs adjacent to the side surface of the connector. In particular, it is possible for the boundary to correspond to the upper face of the connector at a plurality of sections of the contours which are separate from one another and are adjacent to the upper face of the connector.

In one preferred embodiment, the boundary has a linear profile in places. This is particularly advantageous in the situation in which the contour of the side surface of the connector likewise has areas with a linear profile in places. The recess particularly preferably has an essentially polygonal plan area, in particular an essentially triangular plan area.

In one particularly preferred embodiment, the boundary runs essentially equidistantly from the contour of the side surface in a section which is adjacent to the side surface of the connector. By way of example, this is achieved in that, when the recess has an essentially polygonal plan area, one side of the polygon is aligned with respect to the adjacent side surface of the connector. In particular, one side of the polygon can be aligned with respect to an upper face or to a side surface of the connector, and in particular can run parallel to it.

If the welding lug has a constant thickness, then this results in the electrical resistance being independent of the current conduction path. The expression that the boundary runs "essentially" equidistantly from the contour of the side surface means that there is no need for it to be strictly mathematically equidistant. In particular, it is sufficient for the boundary to deviate from strict mathematical equidistance to such an extent that the internal resistance is less than 5% above the value which would be achieved with strict mathematical equidistance.

Particularly preferably, the boundary runs essentially equidistantly from the contour of the upper face in all the sections which are adjacent to the upper face of the connector. This has the advantage that it makes it possible to achieve a particularly low battery internal resistance by means of a battery cell connecting element such as this.

In one preferred method, the connection is a weld, with a boundary pointing downward on a section which is adjacent to the side surface of the connector, during the welding process. This has the advantage that cavities cannot be formed, or can be formed only at points with little disturbing effect. This is because any enclosed air bubbles rise upward during the welding process and therefore gather at a point which is at the maximum distance from the section which is adjacent to the side surface and where there is only a low current density during operation of the battery.

A method is particularly preferable in which the boundary additionally has two sections which are adjacent to one another, have a linear profile, form a corner with one another and, when the two battery cell connecting elements are connected, the corner represents the highest point of the recess. This corner preferably faces away from the side surface of the connector. In this case, any rising air bubbles are concentrated in the corner, combine to form larger air bubbles, and escape particularly quickly. This therefore results in a particularly low cavity density.

BRIEF DESCRIPTION OF THE DRAWINGS

The invention will be explained in more detail in the following text with reference to the drawings, in which:

FIG. 3 shows a battery cell connecting element of a battery according to the invention, according to a second embodiment of the invention, and FIG. 4 shows a battery cell connecting element of a battery according to the invention, according to a third embodiment of the invention.

DETAILED DESCRIPTION OF THE DRAWINGS

Figure 1:
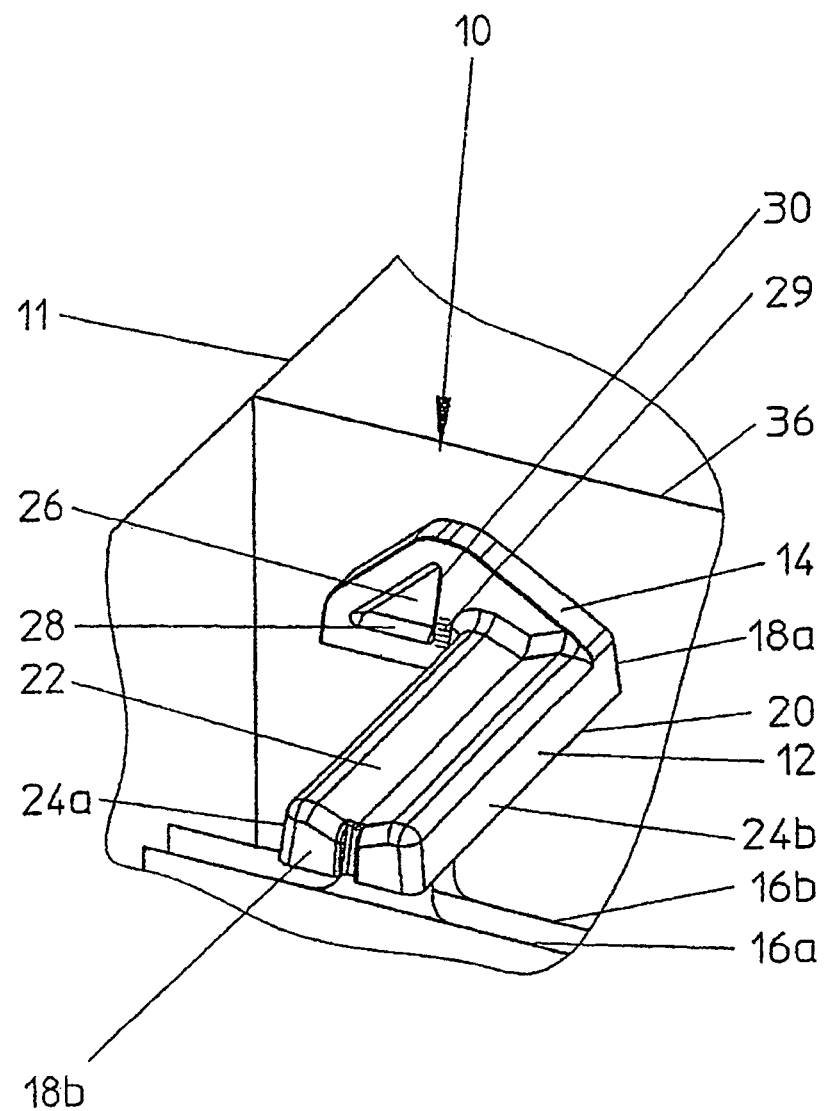
FIG. 1 shows a battery according to the invention with a battery cell connecting element according to a first embodiment of the invention.

FIG. 1 shows a battery cell connecting element 10 of a schematically illustrated battery 11 in the form of a lead-acid rechargeable battery for a passenger motor vehicle, which has a connector 12 and a welding lug 14. The connector 12 and the welding lug 14 are produced at the same time in one casting process, as a result of which the battery cell connecting element 10 is formed integrally. Plates 16a, 16b, ... are arranged at the bottom on the battery cell connecting element 10 and are likewise illustrated schematically in FIG. 1. Throughout the entire description, the spatial direction "downward" means the direction in which the plates 16a, 16b, ... point. In a corresponding manner, the upper face 22 of the connector 12 is that face which faces away from the plates 16a, 16b, .... The plates 16a, 16b, ... are connected to the connector 12 during the manufacture of the battery by means of a cast-on strap (COS) process.

The connector 12 has an essentially cuboid shape and, as side surfaces, has two transverse faces 18a, 18b, a lower face 20, an upper face 22 and two longitudinal faces 24a, 24b.

The longitudinal faces 24a, 24b and the transverse face 18b are inclined at an angle of 7° with respect to the lower face 20, in order to allow the battery cell connecting element 10 to be removed from the mold easily after its production by casting.

The upper face 22 of the connector 12 has an essentially V-shaped contour. The welding lug 14 is arranged on the transverse face 18a of the connector 12 and has a recess 26. The recess 26 has a boundary 28 and is located at the side, alongside the projection area which is obtained by the projection of the cross section of the connector 12 in its longitudinal direction onto the welding lug 14. In FIG. 1, this projection area corresponds to that area on which the connector 12 makes contact with the welding lug 14. The recess 26 is furthermore arranged partially above this projection area.

In a section 30 which is adjacent to the longitudinal face 24a of the connector 12, the boundary 28 has a linear profile, and therefore corresponds to the contour of the longitudinal face 24a, which likewise has a linear profile, of the connector 12.

An electric current which flows from one of the plates 16a, 16b, ... through the connector 12 to the boundary 28 of the recess 26 is subject to an electrical resistance which is essentially independent of the current flow path, in the area 29 of the welding lug 14, which is shown by dashed lines in FIG. 1. The reason for this is that the boundary follows the contour of the longitudinal face 24a such that the distance between the boundary 28 and the longitudinal face 24 is constant in the area 29. As normal, the expression the distance means the connecting line of minimum length between two points.

Figure 2:
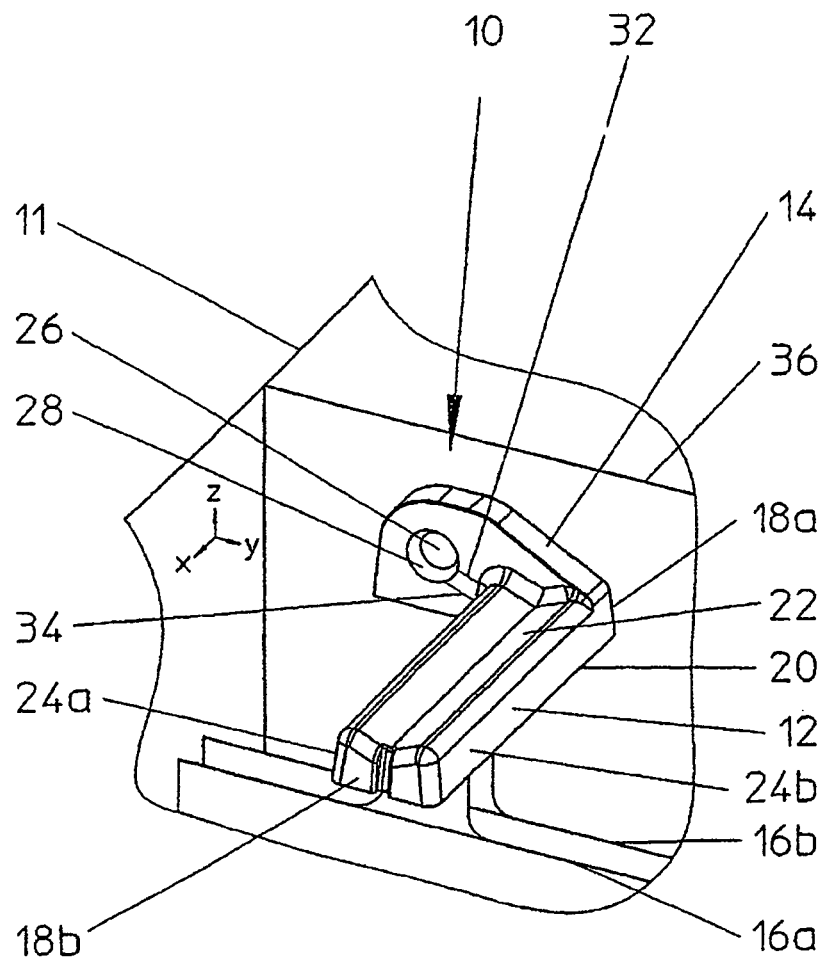
FIG. 2 shows a battery cell connecting element according to the prior art.

FIG. 2 shows a battery cell connecting element according to the prior art, which has a round recess 26. In contrast to the battery cell connecting element 10 shown in FIG. 1, the battery cell connecting element illustrated in FIG. 2 has no section of the boundary 28 which has a profile which corresponds to the contour of the side surface 24a. This means that the electrical resistance which the electric current has to overcome on its path to the boundary 28 is dependent on the current conduction path. A first current conduction path 32 which originates from the longitudinal face 24a is therefore longer than a second current conduction path 34, which is partially concealed by the connector 12 in FIG. 2 and likewise originates from the longitudinal face 24a. For this reason, the electric current is concentrated in the vicinity of the first current conduction path 32, which leads to an increased internal resistance of a battery in which a battery cell connecting element 10 according to the prior art (see FIG. 2) is used.

As is shown in FIG. 1, a battery 11 according to the invention has an internal resistance that is decreased by 5% in comparison to a battery with a battery cell connecting element as shown in FIG. 2, with the same amount of lead.

FIG. 3 shows a second embodiment of a battery cell connecting element 10 in which the welding lug 14 is arranged on the longitudinal face 24b of the connector 12. By way of example, this embodiment is used in batteries for goods vehicles. On the section 30 which is adjacent to the upper face 22, the boundary 28 has a profile which corresponds to the planar contour of the upper face 22 of the connector 12. The boundary 28 of the recess 26 runs equidistant from the contour of the upper face 22 in all the sections which are adjacent to the side surface of the connector 12, specifically the section 30 which runs parallel to the upper face 22. This ensures that, irrespective of the point at which an electric current passes through the welding lug 14 between the section 30 and the upper face 22 of the connector 12, it is always subject to the same electrical resistance. The welding lug 14 is therefore designed such that, when a current flows through the boundary 28, starting from a plate 16a, 16b, ... which is connected to the connector 12, the area-related current density in that section 30 of the boundary which is adjacent to the upper face 22 of the connector 12 is essentially constant. By way of example, the differences between the area-related current densities in the section are less than 10%.

FIG. 4 shows a further embodiment of a battery cell connecting element 10 according to the invention. In this embodiment, the welding lug 14 is arranged on the transverse face 18*a* of the connector 12. The upper face 22 of the connector 12 has an essentially V-shaped contour. In two sections 30*a*, 30*b* which are adjacent to the upper face 22 of the connector 12, the boundary 28 has a profile which corresponds to this V-shaped contour of the upper face 22. Once again, this results in an electrical resistivity which is independent of the current conduction path, in the area 29 which is indicated by shading.

In order to produce a battery 11 according to the invention, two battery cell connecting elements 10, which do not yet have recesses 26 but are provided with plates 16*a*, 16*b* are arranged on both sides of an insulating separating wall 36, which is illustrated schematically in FIG. 1. The separating wall 36 has a recess whose plan area corresponds to the recess 26 which will be created later. The two battery cell connecting elements 10 which are arranged on both sides are in this case arranged with mirror-image symmetry with respect to the separating wall 36.

In order to mount the battery cell connecting elements 10 on the separating wall 36, welding platelets are provided on tongs (which are not shown), which welding platelets have the same shape as the recesses 26 which will be created later. In the situation shown in FIG. 1, the welding platelets have a polygonal shape, specifically a triangular shape.

For fitting, the two battery cell connecting elements 10 are arranged such that the connector points downward. When the tongs are moved to them, the welding platelets are heated and are brought into contact with the welding lugs 14 in the vicinity of the recess in the separating wall 36. The high temperature of the tongs melts the material of the welding lug 14 (this is generally lead), and this material flows through the recess in the separating wall 36. This results in a metallic connection being produced between the battery cell connecting elements 10 which are arranged on both sides of the separating wall.

Any small enclosed air bubbles rise upward and gather at the right-hand upper corner of the recess 26 in FIG. 1. The majority of the small air bubbles are joined together to form relatively large air bubbles, which escape into the atmosphere. If any small air bubbles still remain, then cavities can be formed. However, these cavities are located in the corner of the recess 26 which is at the maximum distance from the connector 12. An electric current which flows from the plates 16*a*, 16*b*, . . . through the separating wall 36 to the battery cell connecting element which is not shown in FIG. 1 but is arranged on the opposite side has only a very low current density in this corner. Any cavities therefore have only a negligible adverse effect on the current.

Since there are hardly any cavities, the described method also results in a particularly firm connection between the two battery cell connecting elements.

LIST OF REFERENCE SYMBOLS

10 Battery cell connecting element
11 Battery
12 Connector
14 Welding lug
16*a*,16*b* Plate
18*a*,18*b* Transverse face
20 Lower face
22 Upper face
24*a*,24*b* Longitudinal face
26 Recess
28 Boundary
29 Area
30 Section
32 First current conduction path
34 Second current conduction path
36 Separating wall

The invention claimed is:

1. A lead-acid rechargeable battery comprising at least one battery cell connecting element (10) comprising:
    (a) a connector (12), which has at least one side surface (22, 24*a*, 24*b*), for connection to at least one plate (16*a*, 16*b*) on a lower face (20) of the connector (12), and
    (b) a welding lug (14), which is electrically conductively connected to the connector (12) and has an open recess (26) which is bounded by a boundary (28),
    wherein, in a section (30) which is adjacent to the side surface (22, 24*a*, 24*b*) of the connector (12) the boundary (28) has a profile which corresponds to a contour of the side surface (22, 24*a*, 24*b*) of the connector (12) and a portion of the boundary overlaps a portion of the side surface of the connector.

2. The battery as claimed in claim 1, wherein the boundary (28) has a linear profile in places.

3. The battery as claimed in claim 1, wherein the boundary (28) has two sections (30*a*, 30*b*) which are adjacent to one another and have a linear profile.

4. The battery as claimed in claim 3, wherein the recess (26) has an essentially polygonal plan area.

5. The battery as claimed in 4, wherein the recess (26) has an essentially triangular plan area.

6. The battery as claimed in claim 1, wherein the boundary (28) runs essentially equidistantly from the contour of the side surface (22, 24*a*, 24*b*) in a section (30) which is adjacent to the side surface (22, 24*a*, 24*b*) of the connector (12).

7. The battery as claimed in claim 6, wherein the boundary (28) runs essentially equidistantly from the contour of the side surface (22, 24*a*, 24*b*) in all the sections (30) which are adjacent to the side surface (22, 24*a*, 24*b*) of the connector (12).

8. The battery as claimed in claim 1, wherein the upper face (22) of the connector (12) has a concave contour, in particular an essentially V-shaped contour.

9. The battery as claimed in claim 1, wherein the connector (12) has an essentially cuboid shape and the welding lug (14) is arranged on a transverse face (18*a*, 18*b*) of the connector (12).

10. The battery as claimed in claim 9, wherein the recess (26) is arranged at the side, alongside the projection area which is obtained by projection of the cross section of the connector (12) in its longitudinal direction onto the welding lug (14).

11. The battery as claimed in claim 9, wherein the recess (26) is arranged above the projection area which is obtained by projection of the cross section of the connector (12) in its longitudinal direction onto the welding lug (14).

12. The battery as claimed in claim 10, that wherein the boundary (28) runs, in places, essentially parallel to an adjacent longitudinal side surface (24*a*, 24*b*) of the connector (12).

13. The battery as claimed in claim 1, wherein the connector (12) has an essentially cuboid shape, and the welding lug (14) is arranged on a longitudinal face (24*a*, 24*b*) of the connector (12).

14. The battery as claimed in claim 1, comprising two battery cell connecting elements (10) which are separated from one another by an electrically insulating separating wall (36), have mirror-image symmetry with respect to the separating wall (36), and are electrically connected to one another through a separating wall recess which is provided in the separating wall (36).

15. The battery as claimed in claim 1, wherein at least one plate (16*a*, 16*b*) is integrally formed on the lower face (20) of the connector (12).

16. The battery as claimed in claim 1, wherein the recess is provided on a face of the welding lug which is bounded by a boundary.

17. The battery as claimed in claim 1, wherein the section of the boundary is provided on a first side of an area of the welding lug, and the side surface of the connector is provided on a second side of an area of the welding lug, the distance between the section of the boundary of the recess and the side surface is constant in the area of the welding lug.

18. The battery as claimed in claim 1, wherein the section of the boundary is provided on a first side of an area of the welding lug, and the side surface of the connector is provided on a second side of an area of the welding lug, wherein the profile of the section of the boundary of the recess is parallel to the profile of the side surface of the connector.

19. The battery as claimed in claim 1, wherein the side surface is provided at an acute angle to the lower face, and the profile of the section of the boundary of the recess is parallel to the profile of the side surface.

\* \* \* \* \*